(12) United States Patent
Reitinger et al.

(10) Patent No.: US 9,249,942 B2
(45) Date of Patent: Feb. 2, 2016

(54) LIGHTING DEVICE FOR A MOTOR VEHICLE

(71) Applicant: ZIZALA LICHTSYSTEME GMBH, Wieselburg (AT)

(72) Inventors: Rüdiger Reitinger, Mautern an der Donau (AT); Johann Altmann, Gmünd (AT)

(73) Assignee: ZIZALA LICHTSYSTEME GMBH, Wieselburg (AT)

( * ) Notice: Subject to any disclaimer, the term of this patent is extended or adjusted under 35 U.S.C. 154(b) by 25 days.

(21) Appl. No.: 14/382,431

(22) PCT Filed: Feb. 19, 2013

(86) PCT No.: PCT/AT2013/050042
§ 371 (c)(1),
(2) Date: Sep. 2, 2014

(87) PCT Pub. No.: WO2013/131114
PCT Pub. Date: Sep. 12, 2013

(65) Prior Publication Data
US 2015/0103548 A1 Apr. 16, 2015

(30) Foreign Application Priority Data
Mar. 7, 2012 (AT) .............. A 50062/2012

(51) Int. Cl.
*F21S 8/10* (2006.01)
*B60Q 1/00* (2006.01)

(52) U.S. Cl.
CPC .............. *F21S 48/125* (2013.01); *B60Q 1/0047* (2013.01); *F21S 48/1159* (2013.01);
(Continued)

(58) Field of Classification Search
CPC . F21S 48/1329; F21S 48/1258; F21S 48/125; F21S 48/24; F21S 48/1159; F21S 48/1283; F21S 48/1394; F21S 48/1747; B60Q 1/0047; B60Q 2400/30; B60Q 1/04; F21V 13/00; F21V 13/04
See application file for complete search history.

(56) References Cited

U.S. PATENT DOCUMENTS 7,201,504 B2 * 4/2007 Collot ................. F21S 48/10
                                                                362/541
8,287,167 B2 * 10/2012 Inaba .................. F21S 48/1159
                                                                362/518
(Continued)

FOREIGN PATENT DOCUMENTS

EP    1184619 A2    3/2002
EP    2071228 A2    6/2009
(Continued)

OTHER PUBLICATIONS

International Search Report of PCT/AT2013/050042 dated May 24, 2013.
(Continued)

*Primary Examiner* — Bao Q Truong
(74) *Attorney, Agent, or Firm* — Sutherland Asbill & Brennan LLP

(57) ABSTRACT

The invention relates to a lighting device (100) for a motor vehicle, comprising a lens (1) and at least one light source (4, 5, 61), wherein light from the at least one light source (4, 61) is projected by the lens (1) into a region lying in front of the lighting device (100), wherein at least one reflective surface (3a) is assigned to the lens (1) at the rear side (3) thereof, and/or wherein the lens (1) has at the rear side (3) thereof at least one total reflection region (3a'), wherein at least one light source (4) radiates light into the lens (1) via an incidence region (40), and wherein the light radiated into the lens (1) via the incidence region (40) is reflected by the at least one reflective surface (3a) and/or the at least one total reflection region (3a') and emerges from the lens (1) via the light exit surface (2) thereof and is projected into a region in front of the lighting device (100).

10 Claims, 2 Drawing Sheets

Figure 3:
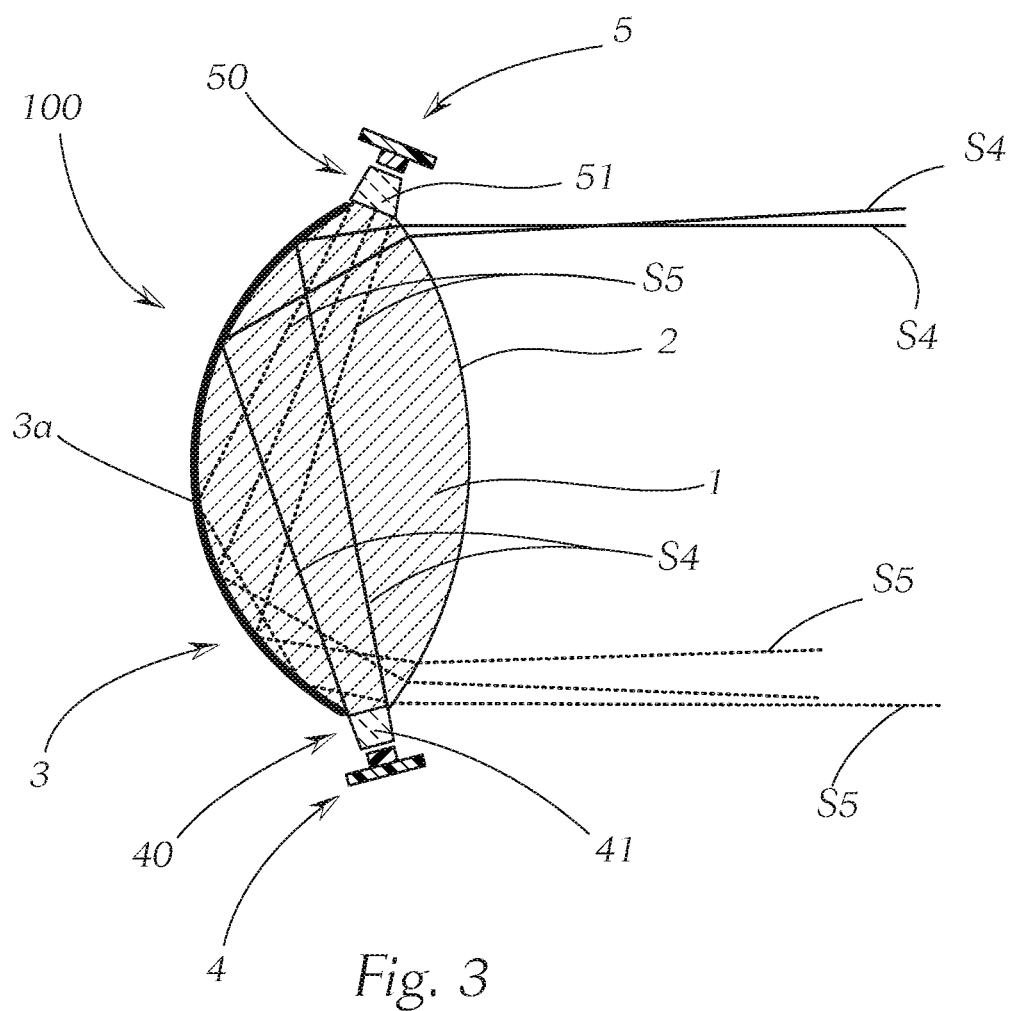

(52) U.S. Cl.
CPC ........ *F21S 48/1258* (2013.01); *F21S 48/1283* (2013.01); *F21S 48/1329* (2013.01); *F21S 48/1394* (2013.01); *F21S 48/1747* (2013.01); *F21S 48/24* (2013.01); *B60Q 2400/30* (2013.01)

(56) References Cited

U.S. PATENT DOCUMENTS

| | | | |
|---|---|---|---|
| 9,033,560 B2 * | 5/2015 | Puente | G60Q 1/0047 362/464 |
| 2006/0232395 A1 | 10/2006 | Tatsukawa | |
| 2009/0027911 A1 | 1/2009 | Misawa et al. | |
| 2009/0290371 A1 | 11/2009 | Yagi | |
| 2010/0039830 A1 | 2/2010 | Cheung et al. | |
| 2010/0321949 A1 | 12/2010 | Ohno et al. | |

FOREIGN PATENT DOCUMENTS

| | | | |
|---|---|---|---|
| EP | 2211087 | A2 | 7/2010 |
| EP | 2360426 | A2 | 8/2011 |
| WO | 2013/073419 | A1 | 5/2013 |

OTHER PUBLICATIONS

Written Opinion of PCT/AT2013/050042 dated Feb. 21, 2014.
First Office Action of Austrian priority Application No. A 50062/2012 dated Dec. 12, 2012.

* cited by examiner

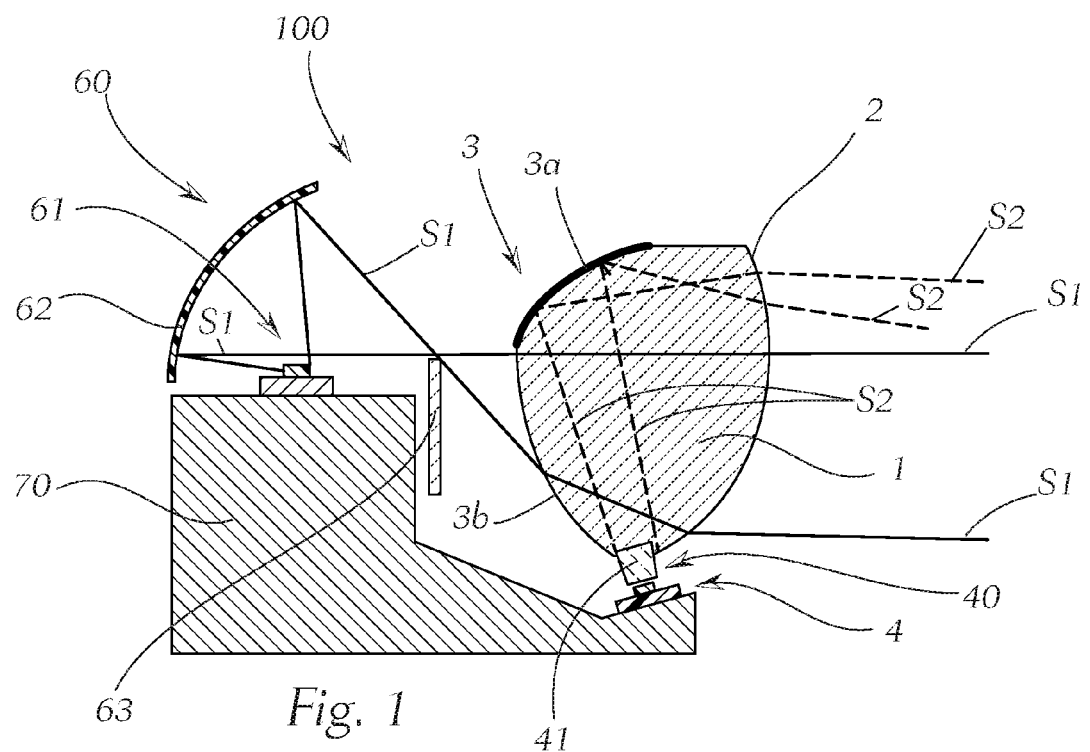
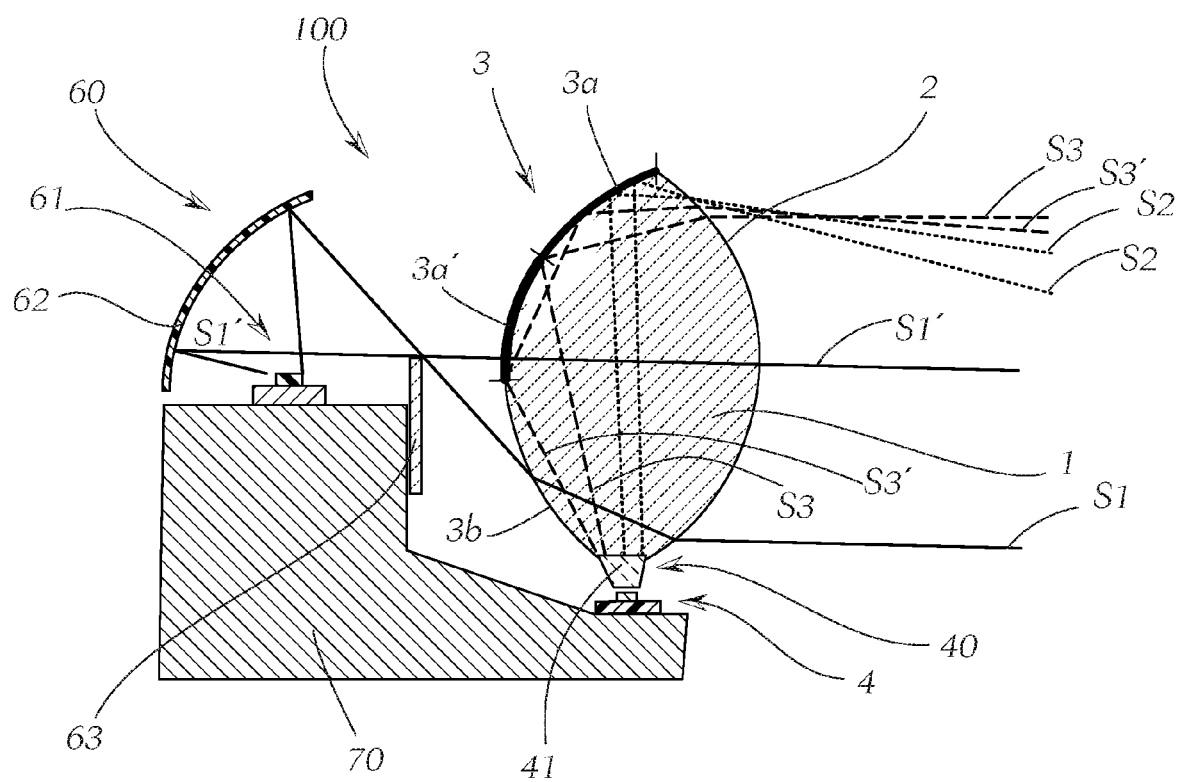

LIGHTING DEVICE FOR A MOTOR VEHICLE

The invention relates to a lighting device for a motor vehicle, comprising a lens and at least one light source, wherein light from the at least one light source is projected by the lens into a region lying in front of the lighting device.

The invention also relates to a vehicle headlight comprising at least one such lighting device.

Projection systems for vehicle headlights in which the light is projected from one or more light sources via a projection lens in order to generate a light distribution in a region in front of the vehicle headlight have long been known. Such projection systems are often used to generate a dipped beam distribution, but are also used by main beam distributions or daytime running light distributions.

The object of the invention is to create a projection module with which two or more light functions can be provided with use of just one lens.

This object is achieved with a lighting device of the type mentioned in the introduction in that, in accordance with the invention, at least one reflective surface is assigned to the lens at the rear side thereof, and/or wherein the lens has at the rear side thereof at least one total reflection region, wherein at least one light source radiates light into the lens via an incidence region, and wherein the light radiated into the lens via the incidence region is reflected by the at least one reflective surface and/or the at least one total reflection region and emerges from the lens via the light exit surface thereof and is projected into a region in front of the lighting device.

With known conventional lenses, light is radiated from a light source onto the lens, contacts the lens on the rear side thereof (light entry surface) and is refracted into the lens. Following a further refraction, the light emerges again at the light exit surface (front side) and is projected into a region in front of the lens or the lighting device.

With the present invention, alternatively or additionally to the above-described "conventional" arrangement, light from one or more light sources is not radiated into the lens via the rear side, but via dedicated light incidence regions. These light incidence regions are "small-scale" compared with the rear side of the lens, via which light is radiated into the lens in conventional systems, that is to say these light incidence regions are equipped with a (much) smaller light entry surface than the rear side of the lens, and therefore the incoming light can be selectively deflected onto the reflective regions.

In this document, the "rear side" is to be understood primarily, in view of the arrangement of the reflective surface (or in other variants with total reflection regions), to be the surface/side of the lens via which light can enter the lens via the lamp device in the case of a "conventional" lighting device. In principle, however, reflective surfaces and/or total reflection regions can also be located in regions over/above, below/beneath or at the sides of or laterally to the lens in regions in which a lamp device does not radiate light, even in conventional systems.

Here, at least one incidence region is arranged outside the rear side of the lens.

Due to reflection of the light radiated in this way into the lens on one or more reflective surfaces assigned to the rear side of the lens and/or on one or more totally reflective total reflection regions on the rear side of the lens, the light is deflected in the direction of the light exit surface of the lens and is projected into a region in front of the lighting device.

With the invention, one or more light sources can be positioned above, beneath or laterally of the lens. The installation space of the lighting device can thus be kept small, and a plurality of light functions, such as main beam, dipped beam, daytime running light, etc., can be achieved by suitable arrangement of the light sources and the reflective surfaces.

Accordingly, it is expedient in order to provide a plurality of light functions if two or more light sources are provided, which each radiate light into the lens via an assigned incidence region, and wherein light radiated via the incidence regions is reflected by the at least one reflective surface and/or the at least one total reflection region and emerges from the lens via the light exit surface thereof and is projected into a region in front of the lighting device.

In order to provide a dedicated light function with each light source, each light source radiating light into the lens via an incidence region is assigned at least one reflective surface and/or at least one total reflection region.

Here, light from a light source radiating light into the lens via an incidence region can emerge from the lens via the light exit surface thereof directly after reflection on at least one reflective surface or on the at least one total reflection region or after further reflection on at least one further reflective surface and/or on at least one further total reflection region.

Depending on the number of reflective/totally reflective regions and arrangement thereof, it is thus possible for light to emerge from the lens after single reflection, but also after multiple reflection.

In order to avoid scattered light and in order to optimise the luminous efficiency, the at least one incidence region may be formed as a coupling-in point, into which the assigned light source couples light, preferably via an attachment optical element.

In this context, it is also advantageous if the at least one light source radiating light into the lens via an incidence region comprises one or more light-emitting diodes.

In order, for example, to optimally utilise light from a light source, a reflective surface assigned to a light source radiating light into the lens via an incidence region can additionally be arranged substantially opposite the assigned light source, as viewed in the primary light exit direction of the light source.

In order to optimally utilise a total reflection region of the lenses, it may be expedient if a total reflection region assigned to a light source radiating light into the lens via an incidence region is arranged outside the primary light exit direction of the assigned light source.

In principle, the at least one reflective surface, which is assigned to the rear side of the lens, can be formed for example as a reflector, which is arranged at a certain distance from the rear side of the lens. However, it is advantageous if the at least one reflective surface is arranged directly on the rear side of the lens and is preferably formed "integrally" therewith. Here, "integrally" does not mean that the reflective surface and lens have to be formed from one material, but that the lens and the reflective surface form a single component following the attachment of the reflective surface. This embodiment has the advantage of fewer components and easier handling in the assembled state and also in view of the optical properties in this variant.

It is particularly advantageous if the at least one reflective surface is formed as a reflective coating of the rear side of the lens.

In a specific variant of the invention, the one or more reflective surfaces can completely shield the rear side of the lens or can cover this completely, for example in the case of a reflective coating. In this case, the use of a lamp device that radiates light onto the rear side of the lens is not possible when the reflective surface(s) is/are not partially transparent.

However, the one or more reflective surfaces may also shield the rear side of the lens merely in regions or may cover this rear side merely in regions.

The regions of the rear side of the lens not shielded or covered can be used, as in known projection systems, so that a lamp device can radiate light into the lens via the rear side, said light then being radiated in order to produce a light distribution in a region in front of the lighting device.

If the lens has one or more total reflection regions on its rear side, light from a dedicated lamp device can thus be radiated through the rear side through these regions in a manner as is known with a "conventional" lens.

So that light passes through the lens from the rear side even in the region of reflective surfaces and the lens can thus be used accordingly to generate a light distribution, one or more of the reflective surfaces can be formed as partially transparent surfaces. The surfaces accordingly allow light coming from outside the lens to enter the lens via the rear side, and therefore this light can be used to generate a light distribution.

Besides the at least one light source, which radiates light into the lens as described above, it may also be advantageous (as already mentioned) for at least one further lamp device to be provided, from which light is radiated onto the rear side of the lens and is projected by the lens into a region in front of the lighting device.

It is particularly advantageous if the lens is assigned at the rear side thereof exactly one continuous reflective surface and/or the lens has on the rear side thereof exactly one continuous total reflection region. Therefore, a plurality of smaller reflective surfaces and/or a plurality of smaller total reflection regions are not provided, but one continuous, that is to say one larger, uninterrupted reflective surface and/or one continuous, larger, uninterrupted total reflection region is provided.

Such an embodiment has a number of advantages. On the one hand, compared with a plurality of smaller regions, the production is considerably simplified, and on the other hand the optical design with a large, uninterrupted surface is also much simpler than if the reflective region and/or the total reflection region is divided into a plurality of individual regions or individual surfaces.

The invention will be explained in greater detail hereinafter on the basis of the drawing, in which FIG. 1 shows a first embodiment of a lighting device according to the invention, FIG. 2 shows a second embodiment of a lighting device according to the invention, and FIG. 3 shows a third embodiment of a lighting device according to the invention.

FIG. 1 shows a first variant of a lighting device 100 according to the invention. This consists, as is known, of a lamp device 60, from which light is radiated onto the rear side 3 of a lens 1 and is projected by the lens 1 into a region in front of the lighting device (light beams S1). In the shown embodiment the lamp device 60 comprises an LED light source 61, which comprises one or more light-emitting diodes, and also a reflector 62, via which the light exiting from the light source 61 is reflected onto the lens 1. The light source 61 is attached on an assembly body, which is preferably formed as a heat sink 70. A screen 63 is arranged in the beam path of the light beams S1 and the upper edge of said screen is imaged in the light exposure as a light/dark boundary of the light distribution, for example of a dipped beam distribution. The light beams S1 enter the lens 1 here via a region 3b of the rear side and emerge again via the light exit surface 2.

In accordance with the invention, the lens 1 has a continuous, uninterrupted reflective coating 3a on its rear side 3. In this document, "rear side" is to be understood primarily, in view of the arrangement of the reflective surface (or in other variants with total reflection regions), to be the surface/side of the lens via which light can enter the lens via the lamp device in the case of a "conventional" lighting device. In principle, however, reflective surfaces and/or total reflection regions can also be located in regions over/above, below/beneath or at the sides of or laterally to the lens in regions in which a lamp device does not radiate light, even in conventional systems.

Further, a light source 4 is provided, which radiates light into the lens 1 via an incidence region 40. In the specific embodiment the light source 4 is likewise arranged on the heat sink 70 and comprises one or more light-emitting diodes. Light from the light source 4 is radiated via an attachment optics 41 into the incidence region 40 formed as a coupling-in region and is thus radiated into the lens 1. The corresponding light beams S2 are reflected on the reflective coating 3a and emerge from the lens 1 via the light exit surface 2. A supplementary light distribution can thus be produced, and therefore a dipped beam and additionally a main beam or daytime running light, for example, can be provided with one lens 1.

In the embodiment shown in FIG. 1, an additional light distribution is produced with the light source 4 above the light/dark boundary of the dipped beam distribution (generated with the lamp device 60), wherein the orientation of the light beams S2 is dependent here on the type of desired light distribution.

The light source 40 is located beneath the lens 1, and the coating 3a is substantially opposite the light source 40 in an upper region of the lens 1. The coating 3a is located in a rear-side region of the lens 1 or on the rear side 3, however in this example it is located in a region of the rear side that is not reached by light from the lamp device 60 due to the special flattened embodiment.

FIG. 2 shows an arrangement similar to FIG. 1. In this variant, the lens 1, however, has a slightly different, less flattened shaping on the rear side 3. Light from the lamp device 60 again enters the lens 1 via the region 3b of the rear side 3 of the lens and is projected into a region in front of the lighting device 100.

In principle, it is true for the invention, that is to say for all shown variants, that the reflected light beams are each oriented in such a way that the legal provisions for the respective light exposure are met. The reflective layer(s) and/or the total reflection region(s) is/are arranged here in such a way and the assigned light source is oriented thereto in such a way that the beams emerging from the lens are radiated in the correct, desired direction.

In an upper region of the rear side 3 of the lens 1, a reflective coating 3a is provided on the lens 1, adjoined downwardly by a total reflection region 3a' of the rear side 3. Beams S2 from the light source 40 contact the reflective coating 3a and are projected thereby out from the lens 1 via the light exit surface 2.

The region 3a' acts in a totally reflective manner for beams S3, S3' from the light source 40. Here, beams S3 are projected out from the lens 1 by the region 3a' directly via the light exit surface 2, whereas beams S3' following the total reflection on the region 3a' still contact the reflective surface 3a before they emerge from the lens 1.

Beams S1' from the lamp device 60 contact the rear side of the lens 1 in the region of the total reflection region 3a' and can enter the lens 1 via this region and can thus be used in a light distribution formed by the lamp device 60. This effect can alternatively also be achieved by providing a reflective coating instead of the total reflection region, which reflective coating is at least partially transparent. This means that the reflective coating (instead of the total reflection region 3a') is formed in such a way that it is transparent for light from the lamp device 60, whereas light contacting the other side of the coating (that is to say from the light source 4 or, with corresponding supplementation of the variant from FIG. 3 by a lamp device 60, from the light sources 4 and 5) is reflected.

This variant with transparent coating instead of a total reflection region can have the disadvantage that light of the light source 40 can be lost without utilisation and that, in some circumstances, undesirable optical effects may be produced. In addition, it may be that in this case increased transmission losses of the light from the lamp device 60 have to be anticipated.

The total reflection region 3a' is thus available between two light sources 40, 61 in order to form two light distributions.

In order to generate a daytime running light distribution in combination with a dipped beam on the basis of a device as shown in FIG. 1 or 2, a dipped beam light source (dipped beam LED) 61 for example can be dimmed in such a way that, supplemented by the light of the light source 4, a complete daytime running light distribution is generated. Alternatively, the light distribution generated by the light source 4 can also be formed such that the daytime running light function is implemented by use of said light source alone. In this case the light source 61 can be deactivated in daytime running light mode.

The common provision of main beam and daytime running light is also possible. Here, an approach can be adopted similar to the case described above of dipped beam and daytime running light.

The simultaneous implementation of fog light and daytime running light is also possible, since the light distribution of a fog headlight has a symmetrical light/dark boundary and the daytime running light accordingly can be produced comparatively easily by an "attached" additional light distribution.

In particular by means of a lateral coupling-in of light, an additional cornering light could be produced where appropriate. Combinations of a plurality of light functions, such as dipped beam, main beam, daytime running light and cornering light in a lens/reflector hybrid system 100 are also possible.

FIG. 3 shows a variant that has no conventional lamp device as in FIG. 1 or 2. Here, two light sources 4, 5 are provided, which each radiate light into the lens 1 via an incidence region 40, 50. Light from the light source 4, 5 is radiated via an attached optics 41, 51 into the incidence region 40, 50 formed as a coupling-in region and thus into the lens 1.

The entire rear side 3 of the lens 1 is provided with a continuous, uninterrupted reflective coating 3a. Light S4 from the lower light source 4 is reflected, as shown, via the coating 3a and for example forms a daytime running light distribution or main beam distribution or contributes thereto. Light S5 from the light source 5 generates a dipped beam, for example. The beams S4, S5 can be reflected once or more on the coating.

Of course, other combinations are also possible, in particular the variants from FIGS. 1 and 2 are not limited to merely one light source 4 and the variant from FIG. 3 is not limited to merely two light sources 4, 5, and therefore further light functions, for example a cornering light, can also be provided.

It would also be quite conceivable in FIG. 3 to form at least part of the rear side of the lens so as to be totally reflective or partially transparent, and therefore a lamp device as described in FIG. 1 or 2 can also be used here, as is known. Further, reflection losses can be reduced by an at least partially totally reflective embodiment of the rear side. Total reflection is possible with a degree of efficacy of up to 100%, whereas conventional reflection is tainted in principle by losses, for example approximately 10% loss.

With a lighting device according to the invention or with one or two (for example left and right headlights in a car, adjacent headlights or lighting devices in a motorbike) corresponding headlights, light distributions can be produced that meet the legal standards, such as SAE, CCC or ECE.

The invention claimed is:

1. A lighting device (100) for a motor vehicle, comprising:
a lens (1) and
at least one light source (4, 61), wherein light from the at least one light source (4, 61) is projected by the lens (1) into a region lying in front of the lighting device (100), wherein:
exactly one continuous reflective surface (3a) is assigned to the lens (1) at the rear side (3) thereof, and/or the lens (1) has at the rear side (3) thereof exactly one continuous total reflection region (3a'),
a light source (4) is arranged beneath the lens (1) and is opposite the exactly one continuous reflective surface (3a), as viewed in the primary light exit direction of the light source (4), and/or the exactly one continuous total reflection region (3a') of the light source (4) is arranged outside the primary light exit direction of the assigned light source (4),
the light source (4) radiates light into the lens (1) via an incidence region (40) in such a way that the light radiated into the lens (1) via the incidence region (40) is reflected by the exactly one reflective surface (3a) and/or the exactly one total reflection region (3a') and emerges from the lens (1) via the light exit surface (2) thereof and is projected into a region in front of the lighting device (100), and
a lower part of the lens (1) is formed as a projection lens, and a lamp device (60) is provided, from which light is radiation from outside onto the rear side (3) onto the lower region of the lens (1) and is projected by the lens (1) into a region in front of the lighting device in order to generate a light distribution with a light/dark boundary.

2. The lighting device according to claim 1, wherein at least one incidence region (40) is arranged outside the rear side (3) of the lens (1).

3. The lighting device according to claim 1, wherein at least one incidence region (40) is formed as a coupling-in point, into which the assigned light source (4) couples light.

4. The lighting device according to claim 1, wherein the at least one light source (40) radiating light into the lens via an incidence region (40) comprises one or more light-emitting diodes.

5. The lighting device according to claim 1, wherein the one reflective surface (3a) is arranged directly on the rear side (3) of the lens (1).

6. The lighting device according to claim 5, wherein the one reflective surface (3a) is formed as a reflective coating of the rear side (3) of the lens (1).

7. The lighting device according to claim 1, one or more of the reflective surfaces is/are formed as (a) partially reflective surface(s).

8. A vehicle headlight comprising at least one lighting device according to claim 1.

9. The lighting device according to claim 1, wherein the light distribution is a dipped beam distribution.

10. The lighting device according to claim 3, wherein the assigned light source (4) couples light via an attachment optical element (41).

\* \* \* \* \*